United States Patent
Huang et al.

(10) Patent No.: US 11,485,615 B2
(45) Date of Patent: Nov. 1, 2022

(54) BATTERY-POWERED RUBBER-TIRED GANTRY CRANE WITH ONBOARD CHARGING SYSTEM

(71) Applicant: Paceco Corp., Hayward, CA (US)

(72) Inventors: Sun Huang, Hayward, CA (US); Sai Cheung, Hayward, CA (US); Leong Wun, Hayward, CA (US)

(73) Assignee: Paceco Corp., Hayward, CA (US)

( * ) Notice: Subject to any disclaimer, the term of this patent is extended or adjusted under 35 U.S.C. 154(b) by 406 days.

(21) Appl. No.: 16/659,516

(22) Filed: Oct. 21, 2019

(65) Prior Publication Data

US 2020/0122983 A1 Apr. 23, 2020

Related U.S. Application Data

(60) Provisional application No. 62/748,330, filed on Oct. 19, 2018.

(51) Int. Cl.
*B60L 50/62* (2019.01)
*B66C 13/22* (2006.01)
*B66C 19/00* (2006.01)

(52) U.S. Cl.
CPC .............. *B66C 13/22* (2013.01); *B60L 50/62* (2019.02); *B66C 19/007* (2013.01); *B60L 2200/40* (2013.01)

(58) Field of Classification Search
CPC ....... B66C 13/22; B66C 19/007; B60L 50/62; B60L 2200/40
See application file for complete search history.

(56) References Cited

U.S. PATENT DOCUMENTS

| | | | |
|---|---|---|---|
| 4,456,097 A | 6/1984 | Salihi | |
| 4,665,696 A * | 5/1987 | Rosman | B66C 19/007 |
| | | | 254/386 |
| 4,667,834 A * | 5/1987 | Lanigan | B66C 19/007 |
| | | | 212/288 |
| 5,936,375 A | 8/1999 | Enoki | |
| 6,308,639 B1 | 10/2001 | Donnelly | |
| 6,390,215 B1 * | 5/2002 | Kodama | B60L 50/62 |
| | | | 180/65.22 |
| 6,441,581 B1 | 8/2002 | King | |
| 6,688,481 B1 | 2/2004 | Adner | |
| 6,732,833 B2 | 5/2004 | Rogelja | |
| 7,165,654 B2 | 1/2007 | Takehara | |
| 7,190,133 B2 | 3/2007 | King | |
| 7,228,942 B2 | 6/2007 | Takehara | |

(Continued)

FOREIGN PATENT DOCUMENTS

CN 101717044 A * 6/2010
CN 201647835 U * 11/2010

(Continued)

*Primary Examiner* — Jacob B Meyer
(74) *Attorney, Agent, or Firm* — Brian Beverly; Beeson Skinner Beverly, LLP

(57) ABSTRACT

A rubber-tired gantry crane (RTG) includes an energy storage device disposed on and configured to provide power to the RTG, a primary charging device disposed on the RTG and configured to charge the energy storage device, and a secondary charging device disposed on the RTG and configured to charge the energy storage device when the RTG is idle or not in operation.

11 Claims, 3 Drawing Sheets

(56) References Cited

U.S. PATENT DOCUMENTS

| | | | |
|---|---|---|---|
| 7,451,883 B2* | 11/2008 | Wierzba | B66C 13/18 |
| | | | 212/316 |
| 7,554,278 B2* | 6/2009 | Wegner-Donnelly | |
| | | | B66C 19/007 |
| | | | 318/375 |
| 9,050,972 B2* | 6/2015 | Severinsky | B60T 8/17 |
| 11,220,186 B1* | 1/2022 | Ogram | B60L 50/62 |
| 2005/0173197 A1 | 8/2005 | Takehara | |
| 2005/0173198 A1 | 8/2005 | Takehara | |
| 2005/0224296 A1 | 10/2005 | Smith | |
| 2005/0285554 A1 | 12/2005 | King | |
| 2006/0061307 A1 | 3/2006 | Donnelly | |
| 2006/0076171 A1 | 4/2006 | Donnelly | |
| 2007/0095776 A1* | 5/2007 | Wierzba | B66C 13/18 |
| | | | 212/344 |
| 2007/0095777 A1* | 5/2007 | Wierzba | B66C 13/44 |
| | | | 212/345 |
| 2008/0121444 A1* | 5/2008 | Bauer | B60K 6/46 |
| | | | 180/65.1 |
| 2009/0230072 A1* | 9/2009 | Wierzba | B66C 11/14 |
| | | | 212/324 |
| 2010/0065344 A1* | 3/2010 | Collings, III | B60L 3/10 |
| | | | 180/2.1 |
| 2010/0147606 A1* | 6/2010 | Kalenborn | B60K 6/46 |
| | | | 180/65.21 |
| 2011/0192816 A1* | 8/2011 | Wierzba | B66C 11/14 |
| | | | 212/316 |
| 2013/0001183 A1* | 1/2013 | Wierzba | B66C 11/04 |
| | | | 212/316 |
| 2013/0257145 A1* | 10/2013 | Caldeira | B60L 53/00 |
| | | | 307/9.1 |
| 2020/0122983 A1* | 4/2020 | Huang | B66C 13/22 |

FOREIGN PATENT DOCUMENTS

| | | | | |
|---|---|---|---|---|
| CN | 102148513 B | * | 8/2014 | B66C 19/007 |
| CN | 208691003 U | * | 4/2019 | |
| CN | 211377680 U | * | 8/2020 | |
| EP | 0206110 A1 | * | 12/1986 | B60L 50/13 |
| EP | 2930041 A1 | * | 10/2015 | F16D 41/04 |
| JP | 2006131311 A | * | 5/2006 | |
| WO | WO-2007143841 A1 | * | 12/2007 | B66C 13/18 |
| WO | WO-2012057711 A1 | * | 5/2012 | B62M 7/02 |
| WO | WO-2014112309 A1 | * | 7/2014 | B60L 7/16 |
| WO | WO-2016206800 A1 | * | 12/2016 | B66C 13/22 |
| WO | WO2015145748 A1 | * | 4/2017 | B66C 19/007 |

* cited by examiner

BATTERY-POWERED RUBBER-TIRED GANTRY CRANE WITH ONBOARD CHARGING SYSTEM

CROSS-REFERENCE TO RELATED APPLICATIONS

This application claims the benefit of U.S. Provisional Application No. 62/748,330 filed Oct. 19, 2018, the entire contents of which are incorporated herein by reference.

BACKGROUND

Field of the Invention

This invention relates to a rubber-tired gantry crane (RTG) and, more particularly, relates to a battery-powered electric RTG (e-RTG) having an onboard charging system.

Discussion of the Prior Art

An RTG is a mobile gantry crane used in shipping terminals to stack and store shipping containers. Today, RTG's are commonly run on diesel-powered engine-generators that provide full operational power to the RTG, Such diesel-powered engine-generators are often sized as large as 500 horsepower or more and produce significant engine exhaust. RTGs operating in shipping terminals in California must meet strict emissions requirements set by the California Air Resources Board, including a mandate to decrease emission levels by the year 2030, Accordingly, decreasing RTG emissions is a critical objective for the improved design of RTGs. Hybrid and fully electric RTGs (e-RTGs) have been introduced that reduce or eliminate emissions.

A hybrid RTG is equipped with a propane or diesel engine-generator combined with a battery system which, together, power the motors of the RTG. With the addition of a battery system, the hybrid RTG can utilize a smaller engine-generator, about half the size of the more typical 500 HP propane or diesel engine-generators, thereby producing reduced emissions (e.g., a reduction of emissions by 50%). Additionally, a hybrid RTG can take advantage of energy recovery mechanisms, such as regenerative braking, to recharge the battery system when the RTG is performing braking or container-lowering actions, further improving energy efficiency. The engine-generator allows for rapid refueling of the hybrid RTG. Despite these improvements, hybrid RTGs still produce considerable emissions. As a result, efforts have turned to the development of fully electric e-RTGs that produce zero emissions.

Today's e-RTGs either connect directly to a power distribution infrastructure or are powered by a battery system. In an above-ground power bar system, an e-RTG connects directly to a power distribution infrastructure that may include a series of above-ground power bars supported on posts that are distributed throughout the shipping terminal. In a cable reel carrier (CRC) system, an e-RTG is connected to a wheeled cable reel carrier, which carries a power cable that plugs directly into the e-RTG and connects the e-RTG to a, typically underground, power distribution infrastructure.

The cable reel carrier moves in tandem with the e-RTG during operation. Both the above-ground power bar system and CRC system require considerable power distribution infrastructure to be constructed and maintained within the shipping terminal, either above ground or underground, and the associated power bars, posts and cabling introduce substantial safety hazards.

More recently, battery-powered e-RTGs have been introduced. Despite the advantage of greater portability due to being freed from the local power distribution system, battery-powered e-RTGs suffer from several limitations that have challenged their mass-market acceptance. Battery-powered e-RTGs must be charged overnight after each day's operation which requires a substantial investment of time, money and materials to install charging stations to keep the e-RTGs powered up. In addition, due to the large size of each e-RTG, it is difficult to accommodate enough charging stations in the shipping terminal for the simultaneous overnight charging of multiple e-RTGs.

Thus, there remains a need for an RTG that produces less emissions than a hybrid RTG, while avoiding the need for an elaborate power distribution infrastructure or charging stations.

SUMMARY OF THE INVENTION

The present invention provides for a battery-powered e-RTG having an onboard charging system.

In one embodiment of the invention, an e-RTG includes an energy storage device, such as a rechargeable battery, disposed on and configured to provide power to the e-RTG, and a charging device, such as a propane or diesel-powered engine-generator, disposed on the e-RTG and configured exclusively to charge the energy storage device.

In another embodiment of the invention, an e-RTG includes an energy storage device disposed on and configured to provide power to the e-RTG and two charging devices disposed on the e-RTG and configured exclusively to charge the energy storage device. The two charging devices include a primary charging device configured exclusively to charge the energy storage device when the e-RTG is in operation and a secondary charging device configured exclusively to charge the energy storage device when the e-RTG is idle or not in operation.

A battery-powered e-RTG according to the invention produces less emissions than a hybrid RTG, while avoiding the need for the significant power distribution infrastructure or charging stations required by prior art e-RTGS.

BRIEF DESCRIPTION OF THE DRAWINGS

Exemplary embodiments of the invention will now be described with reference to the accompanying drawings, in which.

DETAILED DESCRIPTION OF THE ILLUSTRATED EMBODIMENTS

Figure 1:
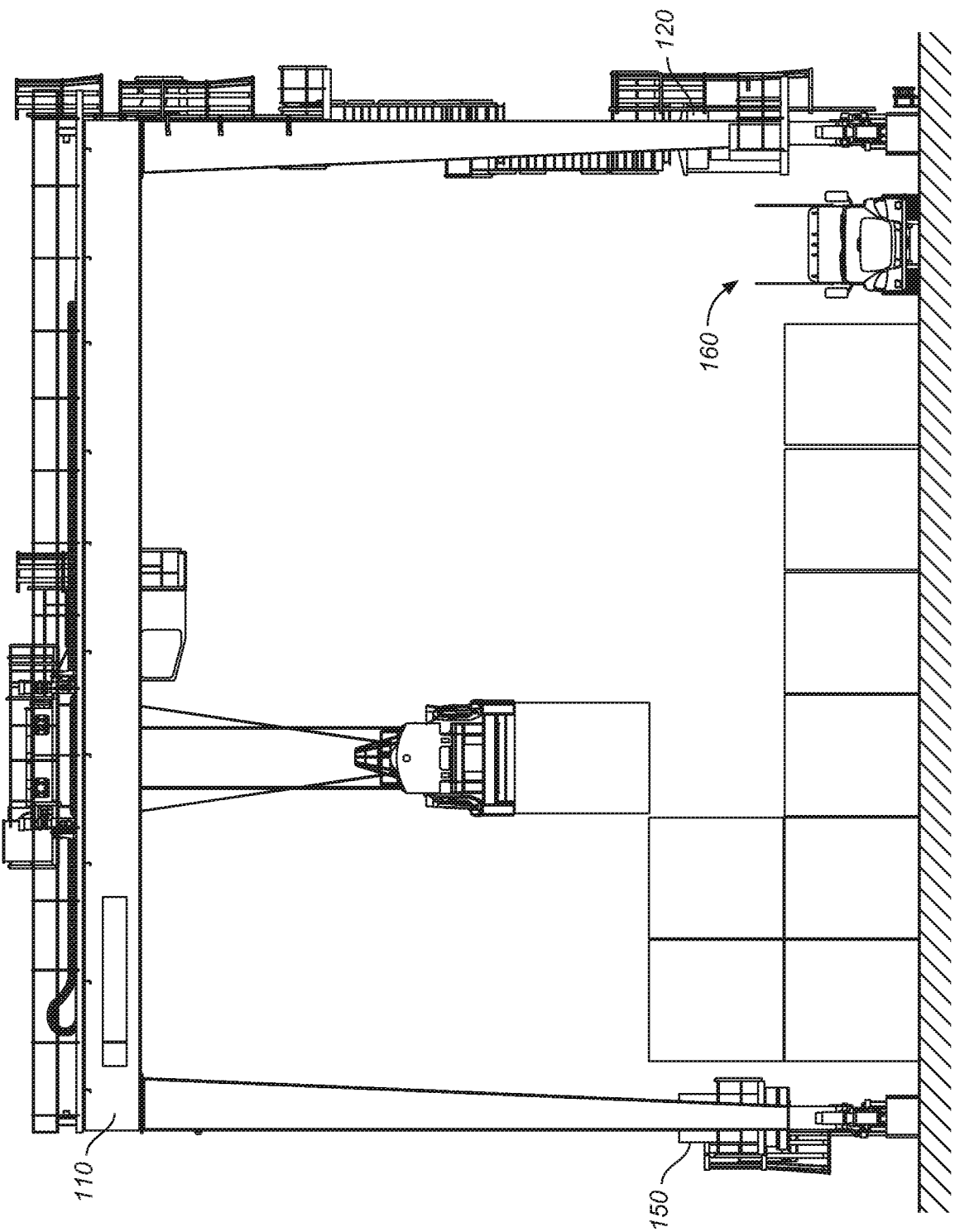
FIG. 1 is an elevational view of a first embodiment of an e-RTG with an onboard charging system according to the invention.
Figure 2:
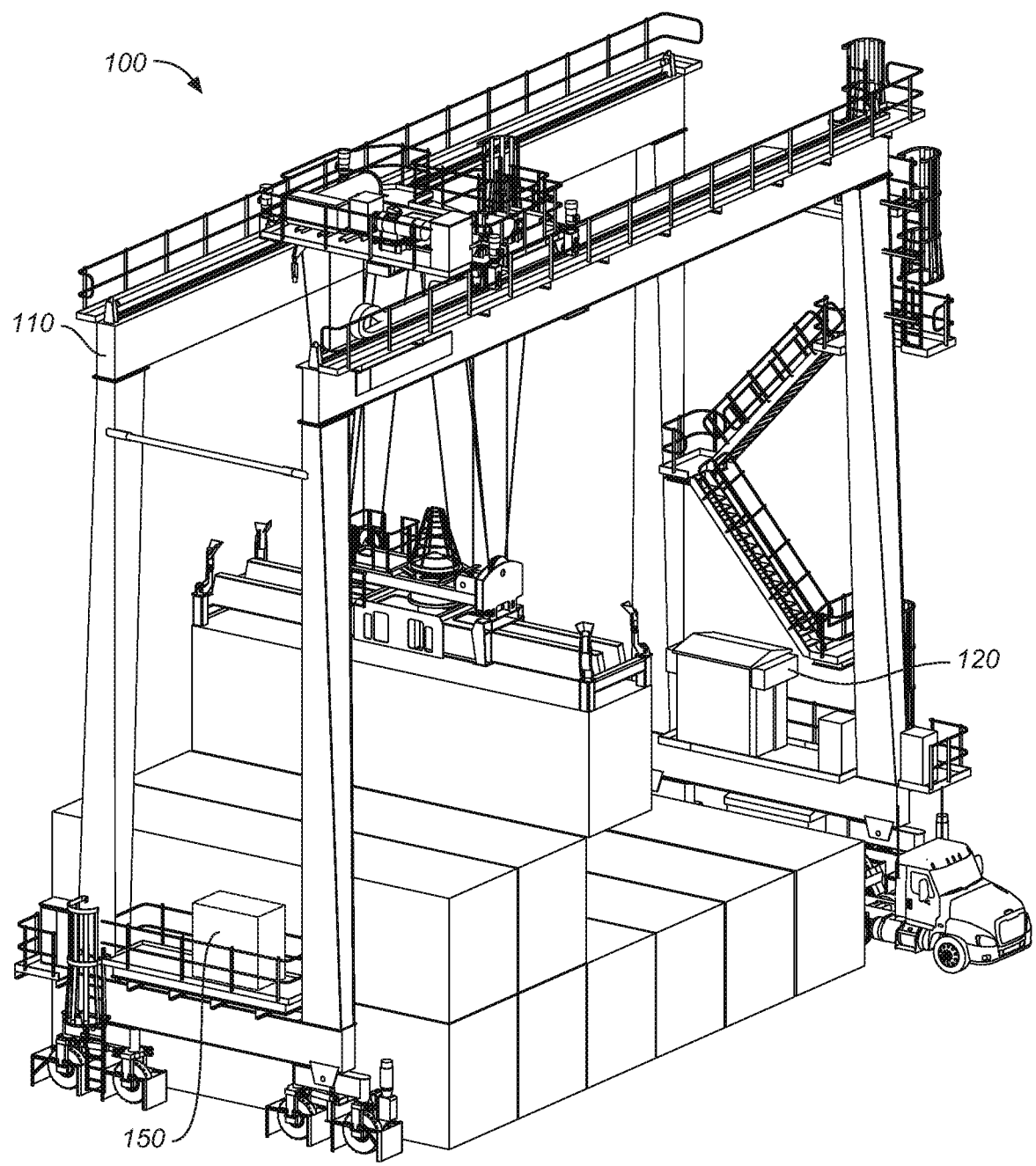
FIG. 2 is an upper left perspective view thereof.

FIGS. 1 and 2 show a first embodiment (100) of a battery-powered e-RTG with an onboard charging system according to the invention. The illustrated e-RTG includes an RTG (110) onto which an energy storage device (120), such as a rechargeable battery, is disposed, for example, within an onboard electrical room. The energy storage device supplies all the power needed to operate the RIG, including all container handing operations.

A charging device (150), for example, in the form of a propane gas or diesel engine-generator, is mounted to or otherwise disposed on the RTG, for example in an onboard engine room located away from the truck lane (160) and other hazards.

Unlike the engine-generator of a hybrid RTG, the onboard charging device (150) is configured exclusively to charge the energy storage device (120) and not to drive the motor or motors of the RTG. As a result, it can be much smaller than the typical engine-generator of a hybrid RTG. For example, a 50 horsepower or smaller propane or diesel engine-generator may be used for the charging device to provide enough power to the energy storage device to allow for the continuous operation of the e-RTG, free of interruptions. A 50-horsepower engine-generator would be about 10% the size of a 500 horsepower RTG diesel engine-generator, lowering emissions to just 10% of a conventional, fully diesel-engine powered RTG.

Figure 3:
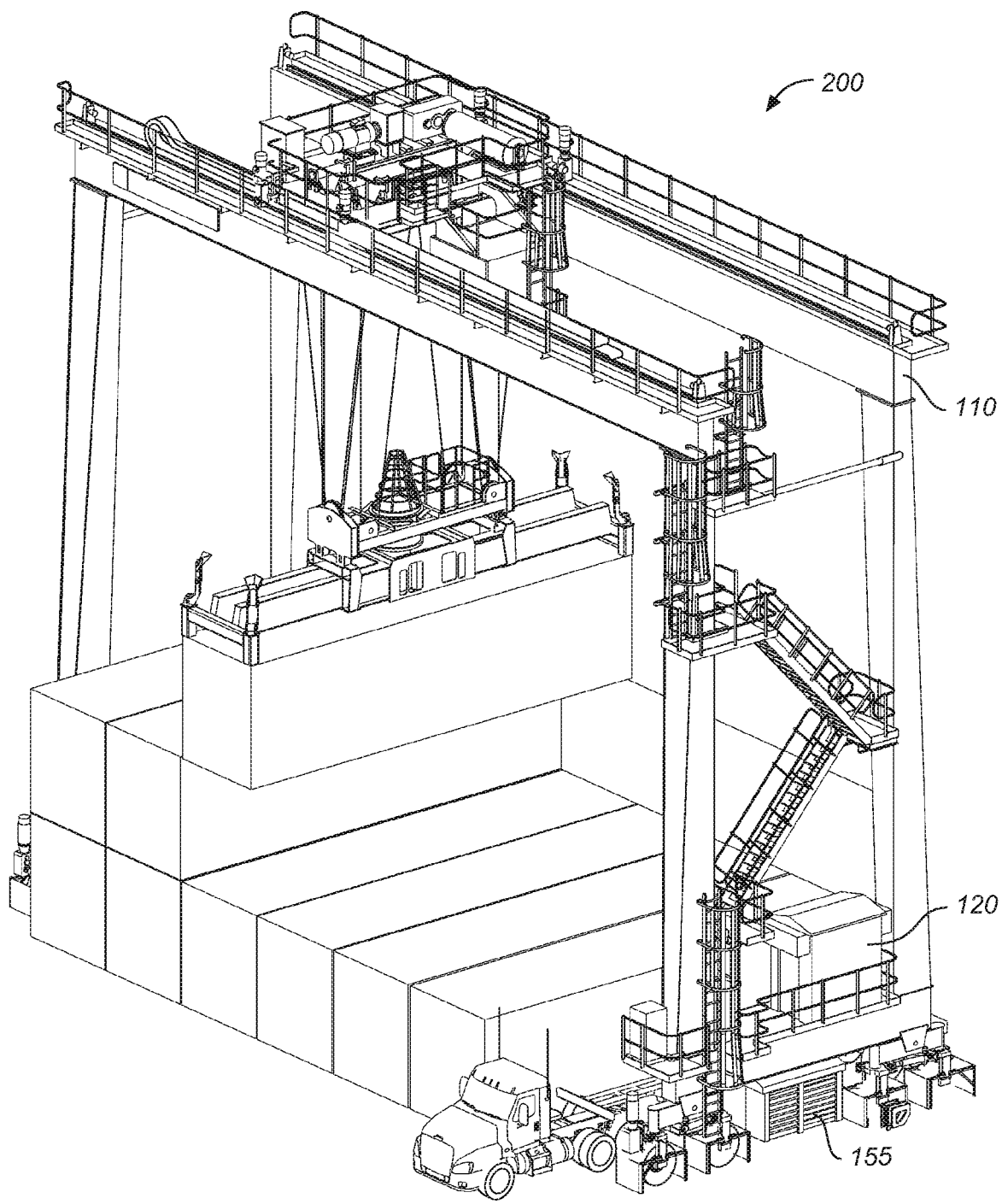
FIG. 3 is an upper right perspective view of a second embodiment of an e-RTG with an onboard charging system according to the invention.

FIG. 3 shows a second embodiment (200) of an e-RTG with an onboard charging system according to the invention. In this alternative embodiment, a secondary charging device (155) is disposed on the e-RTG and is preferably of a smaller size than the primary charging device (150) (shown in FIGS. 1 and 2). For example, if the charging devices are diesel-powered engine generators, the primary engine-generator may be 50 horsepower, while the secondary engine-generator may be 25 horsepower. The secondary charging device (155) is used exclusively to charge the energy storage device (120) when the e-RTG is sitting idle or not in operation. When the e-RTG has stopped operation or is idle, the first charging device will turn off and the secondary charging device will turn on and will begin to charge the energy storage device. The secondary charging device may be further configured to automatically turn off when the energy storage device is fully charged. In this second embodiment, the smaller, secondary charging device may, for example, be installed under the sill beam of the electrical room (120). The smaller secondary charging device further lowers the emissions produced by the e-RTG.

Being fully portable, the e-RTG of the invention requires no power distribution infrastructure. As a result, there is no need to alter the existing shipping terminal facilities, and significant costs and safety hazards can be avoided by eliminating the need for power bars, posts, cabling or any other dedicated power infrastructure.

In addition, use of the e-RTG according to the invention eliminates the need to plug the e-RTG into a charging station after each day's operation, thereby avoiding the need for any charging station infrastructure and the associated labor required to maintain and operate charging stations. The fuel tank of the engine-generator can be sized to be large enough, for example, for weekly or biweekly operation of the e-RTG without the need for refueling.

Like the hybrid RTG, an e-RTG according to the invention can be rapidly refueled by simply refilling the engine-generator, for example, with propane gas or diesel delivered to the e-RTG by truck. Also like the hybrid RTG, the e-RTG of this invention can take advantage of energy recovery mechanisms, such as regenerative braking, to recharge the battery system when the e-RTG is performing braking or container-lowering actions, further improving energy efficiency. Moreover, since the onboard charging device, i.e., engine-generator, is configured exclusively to charge the energy storage device, it can be much smaller than that of a comparable hybrid RTG, further reducing emissions.

In addition, as an alternative to a propane gas or diesel engine-generator, the e-RTG of the invention can utilize a hydrogen-powered engine generator for the onboard charging device. A hydrogen-powered e-RTG according to the invention would have the added benefit of eliminating noxious emissions altogether.

Certain embodiments of a battery-powered e-RTG having an onboard charging system have thus been described and illustrated herein in detail. These embodiments are merely example implementations of the invention and are not to be taken as limiting, the spirit and scope of the invention being limited only by the terms of the appended claims and their legal equivalents.

We claim:

1. A rubber-tired gantry crane (RTG) comprising:
a rechargeable battery disposed on and configured to supply all power needed to operate the RTG,
a primary engine-generator disposed on the RTG and configured exclusively to charge the battery when the RTG is in operation, and
a secondary engine-generator disposed on the RTG and configured exclusively to charge the battery when the RTG is idle or not in operation.

2. The rubber-tired gantry crane of claim 1, wherein:
the secondary engine-generator is smaller than the primary engine-generator.

3. A rubber-tired gantry crane (RTG) comprising:
an energy storage device disposed on and configured to supply all power needed to operate the RTG,
a primary charging device disposed on the RTG and configured to charge the energy storage device when the RTG is in operation, and
a secondary charging device disposed on the RTG and configured to charge the energy storage device when the RTG is idle or not in operation.

4. The rubber-tired gantry crane of claim 3, wherein:
the energy storage device comprises at least one rechargeable battery.

5. The rubber-tired gantry crane of claim 3, wherein:
the primary charging device comprises an engine-generator.

6. The rubber-tired gantry crane of claim 5, wherein:
the engine-generator comprises a hydrogen-powered engine.

7. The rubber-tired gantry crane of claim 5, wherein:
the engine-generator comprises at least one engine configured to run on a fuel selected from the group consisting of gasoline, diesel, natural gas, propane, biodiesel, hydrogen or water.

8. The rubber-tired gantry crane (RTG) of claim 1 wherein the secondary charging device comprises an engine-generator.

9. The rubber-tired gantry crane of claim 3, wherein:
the secondary charging device is smaller than the primary charging device.

10. The rubber-tired gantry crane of claim 3, wherein:
the secondary charging device has no more than half the power of the primary charging device.

11. The rubber-tired gantry crane of claim 3, wherein:
the secondary charging device has no more than 25 horsepower.

* * * * *